United States Patent [19]
Sweaney

[11] Patent Number: 6,055,737
[45] Date of Patent: May 2, 2000

[54] QUICK MOUNT ANGLE MEASUREMENT GAUGE

[76] Inventor: Scylvester L. Sweaney, 317 Burleson Rd., El Dorado, Ark. 71730

[21] Appl. No.: 09/096,390

[22] Filed: Jun. 11, 1998

[51] Int. Cl.⁷ .............................. G01B 3/56; G01B 5/24
[52] U.S. Cl. .................................................. 33/534; 33/1 N
[58] Field of Search ........................... 33/534, 538, 543, 33/1 N; 116/284, 285, 303

[56] References Cited

U.S. PATENT DOCUMENTS

| | | | |
|---|---|---|---|
| 1,477,962 | 12/1923 | Kinzler | 116/284 |
| 2,288,229 | 6/1942 | Dick | 116/284 |
| 3,098,305 | 7/1963 | Anderson | 33/534 |
| 3,738,012 | 6/1973 | Sherman | 33/172 |
| 4,131,008 | 12/1978 | Malatto | 72/389 |
| 4,338,723 | 7/1982 | Benjamin | 33/534 |
| 4,640,113 | 2/1987 | Dieperink | 72/21 |
| 5,285,668 | 2/1994 | Toaki | 72/10 |
| 5,337,489 | 8/1994 | Mustafa | 33/832 |
| 5,375,340 | 12/1994 | Gerritsen | 33/534 |

FOREIGN PATENT DOCUMENTS

| | | | |
|---|---|---|---|
| 0000509 | 1/1982 | Japan | 33/1 N |
| 0012314 | 1/1982 | Japan | 33/1 N |

*Primary Examiner*—Diego Gutierrez
*Assistant Examiner*—Faye Francis
*Attorney, Agent, or Firm*—Stephen D. Carver

[57] ABSTRACT

A quick mount angle measurement gauge to be retro-fitted to a movable machine part provides a cost-effective, portable angle detecting system for machines including press brakes and the like. A rigid tubular housing is secured adjacent the machine being monitored by an adjustable arm fastened by a clamp. An indicator gauge at the front of the housing provides a marked dial. A pointer includes an indicator needle disposed over the dial, and an elongated shaft threadably mated to a longitudinally displaceable actuator within the housing interior. A cable couples the actuator to the movable machine part, so cable-driven actuator movement is directly proportional to the resultant rotation of the pointer.

16 Claims, 6 Drawing Sheets

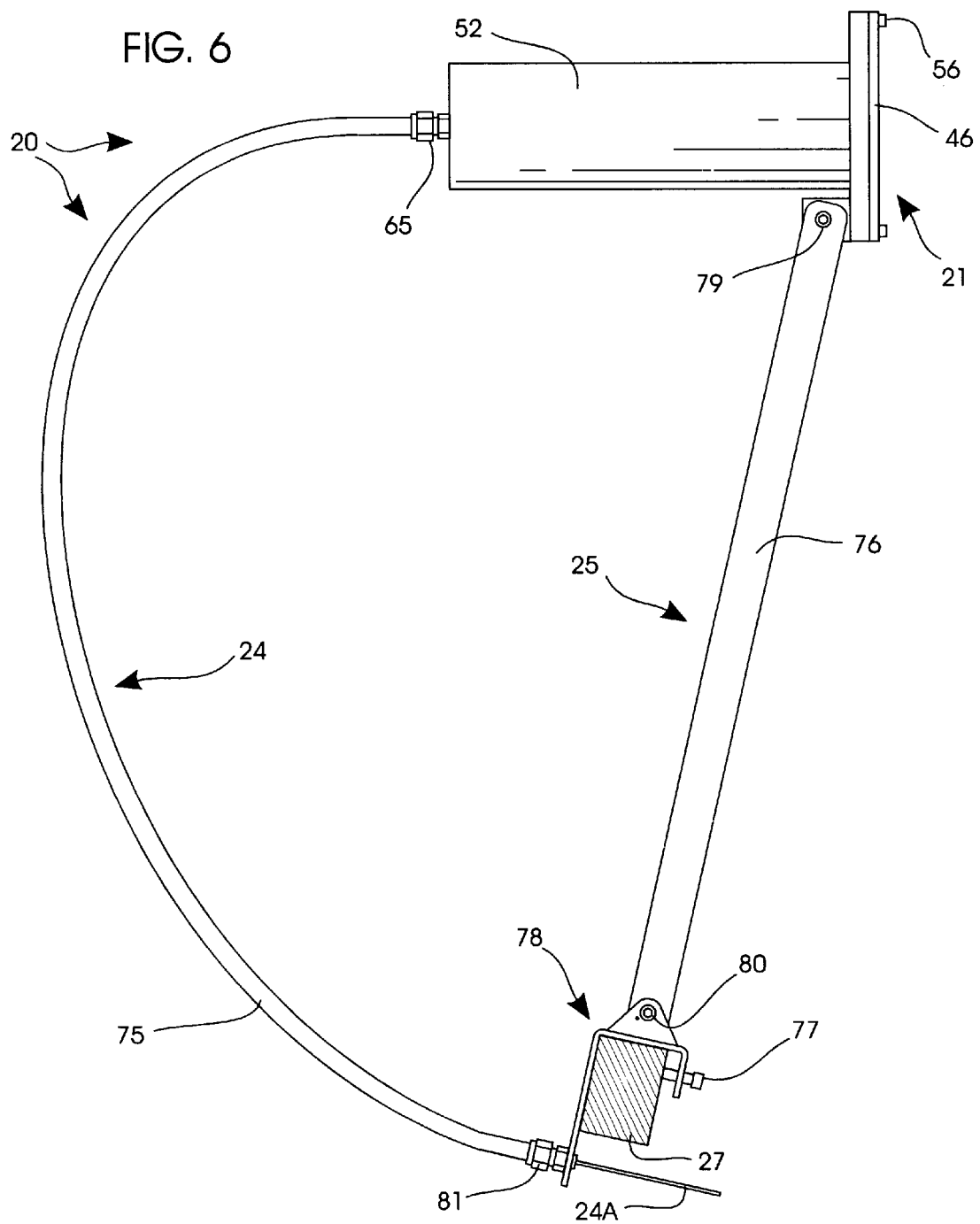

QUICK MOUNT ANGLE MEASUREMENT GAUGE

BACKGROUND OF THE INVENTION

I. Field of the Invention

The present invention relates generally to accessory gauges for measuring angles. More particularly, the present invention relates to a portable, angle measuring gauge that may be quickly retrofitted to material bending apparatus including sheet metal brakes and the like. Known prior art devices are found in United States Patent Class 33, Subclass 534.

II. Description of the Prior Art

In many manufacturing operations, it is necessary to check the angular relationship of one part with respect to another part. For example, in home restoration and building applications it is desirable to bend aluminum siding or sheet metal. Several sheets of material must be custom bent to finish the job. The bend angle created in these several sheets must be uniform for a correct fit. While measuring instruments have been devised for the measurement of angles, such instruments are quite complicated and very specialized in that they are constructed for the measurement of angles under particular circumstances.

U.S. Pat. No. 5,375,340 describes a device for measuring the bend angle of a metal sheet in a press brake. This is achieved by using a small disk mounted on a support. The disk is capable of rotating over a limited angle. The rotation of the disk is detected by a device that calculates the bend angle based on the disk's movement. One problem associated with a measuring device of this type is that it is part of the press. Another problem is that a complex detection means are required to provide the measuring signals to enable the device to calculate the bend angle. Yet another problem is that a measuring device of this type is not portable.

Other prior art devices for monitoring the bend angle are adapted to fit sheet bending presses that attach to press without requiring a special die. These devices detect a bending angle using a sensor mounted to a back stop. The sensor is connected electronically to the press. Signals from the sensor are sent to a control mechanism on the press to control the angle formed. A problem with devices of this type is that the require complex electronic circuits to control the press. A further problem associated with devices of this type is that they are not able to produce a limited number bends containing unique angles without costly reprogramming. Another problem is that these devices are not easily moved from one job site to another.

For example, when installing aluminum siding it is often necessary to adapt several pieces of siding to conform to a unique structure encountered during the course of the job. Portable bending devices are used to shape the siding in the field. These portable benders are hand operated press brakes in which an operator uses a lever to apply the pressure that bends the siding. The operator must rely on the "feel" of the press or mearly view the bend as it takes place to try and create several pieces with a uniform bend angle. This results in pieces with angles that are not precise and as such do not fit correctly. These pieces are discarded and new bends attempted. This results in increased time and cost to complete the job.

Thus, it is desirable to have a portable retrofitting device for accurately measuring the angular displacement of a moveable machine part.

SUMMARY OF THE INVENTION

This invention provides a quick mount angle measurement gauge that is directed to overcoming the problems as set forth above. According to the present invention a gauge for displaying the angular displacement of a movable machine part, such as a sheet metal press die, is mounted to a machine. The gauge comprises a viewable dial secured to one end of housing. A cable is attached to an actuator located within the housing and the other end of the cable is attached to the movable machine part.

A primary object of the invention is to provide a quick mount angle measurement gauge that accurately measures the angular displacement of a machine part.

Another object of the invention is to provide a quick mount angle measurement gauge that is portable.

One of the objects of the present invention is to provide a quick mount angle measurement gauge for an accurate measurement of angles which can be applied to a standard dial indicator.

Another object of the present invention is to provide a quick mount angle measurement gauge which actuates a standard dial indicator in linear relationship to the measurement angle.

Yet another object of the present invention is to provide a quick mount angle measurement gauge that does not require the use of complex detection circuits for measuring the angular displacement of a movable machine part.

A further object of the present invention is to provide a quick mount angle measurement gauge that has a low maintenance cost.

Another object of the present invention is to provide a quick mount angle measurement gauge that may be retrofitted to a variety of machines.

Still another object of the present invention is to provide a quick mount angle measurement gauge that allows the use of different gauge faces.

Another object of the present invention is to provide a quick mount angle measurement gauge that is easily repaired on a job site.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
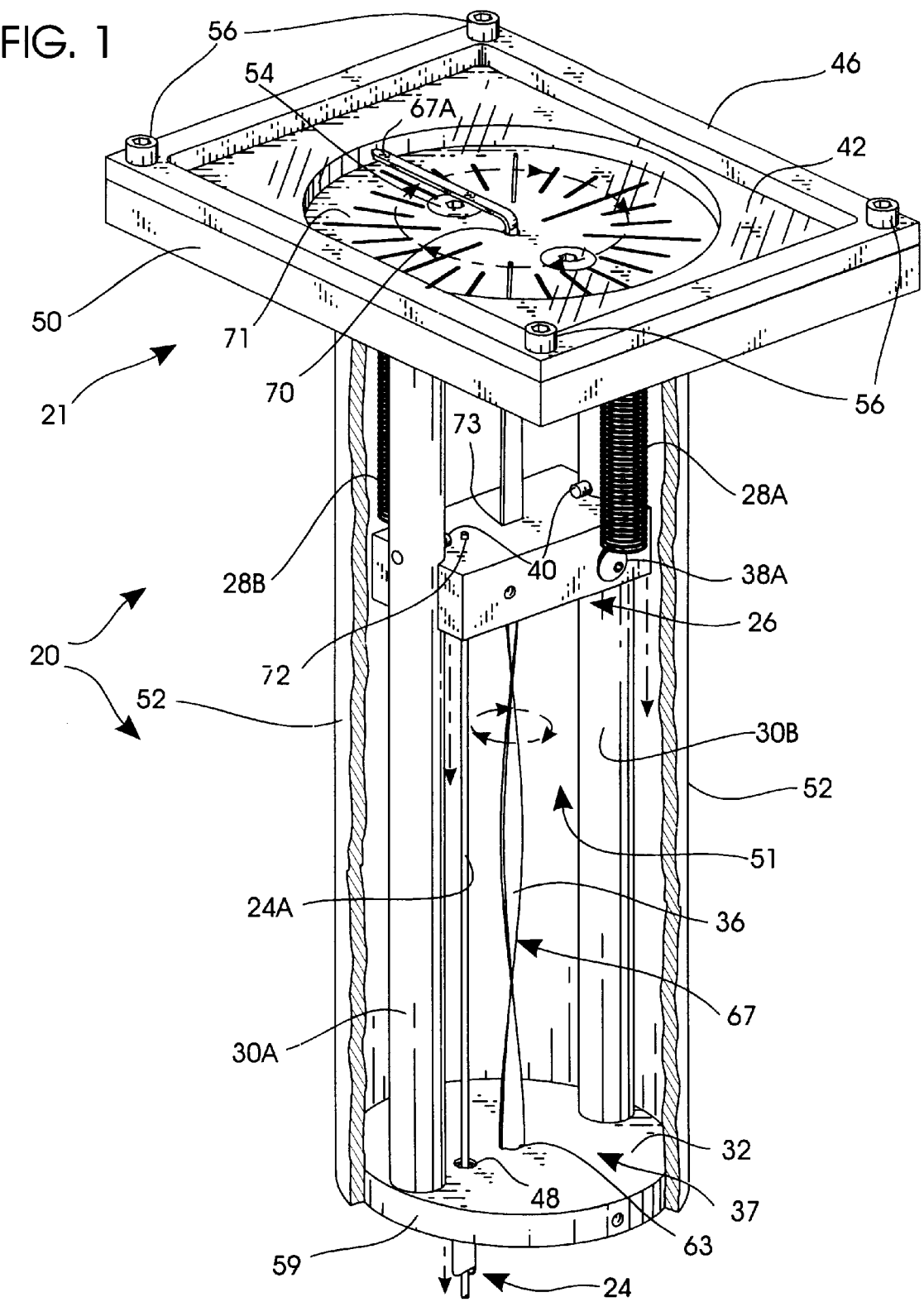
FIG. 1 is a partially fragmentary, isometric view of the of the best mode of my invention, with portions shown in section for clarity.
Figure 2:
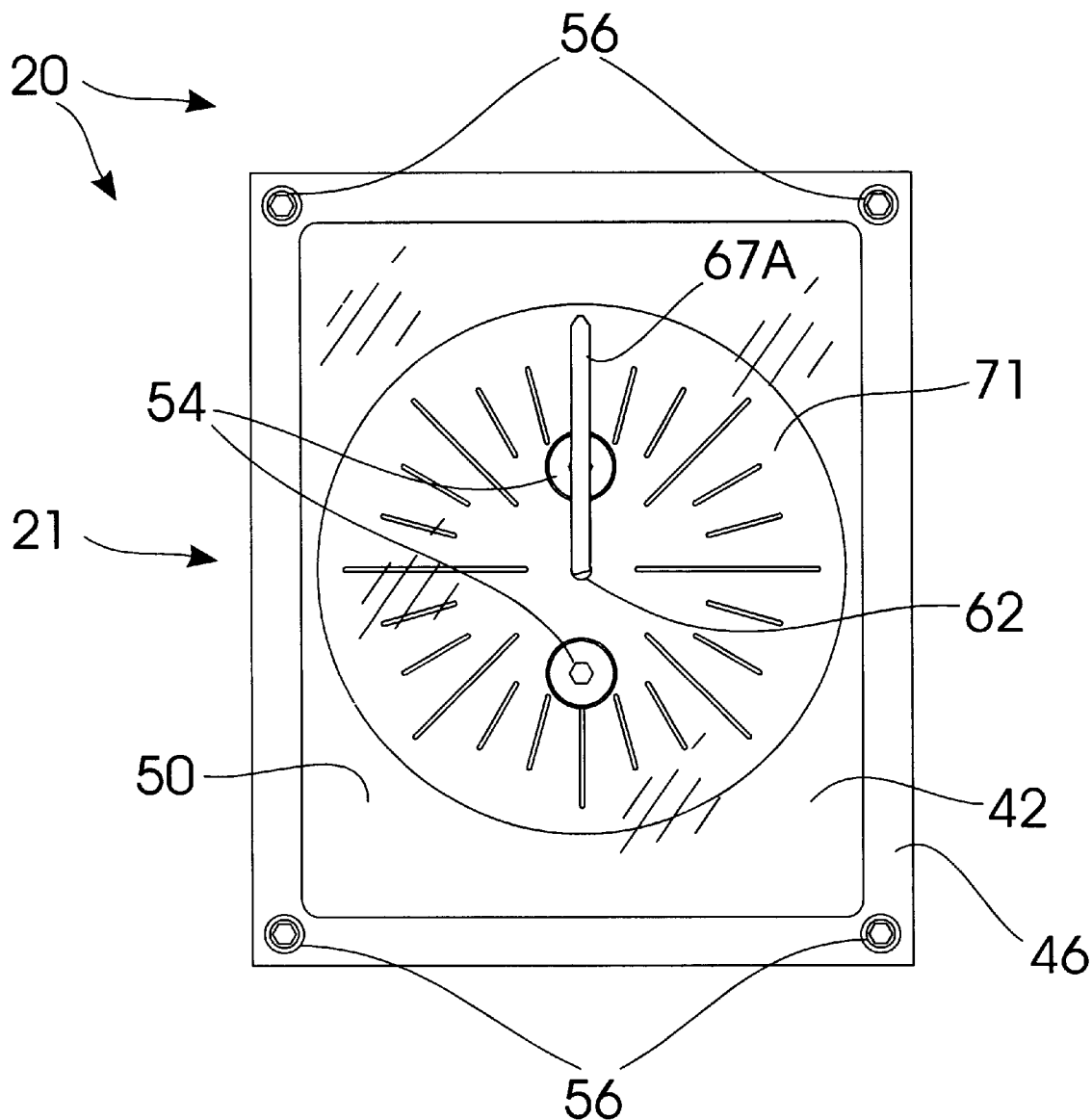
FIG. 2 is a top view of the invention.
Figure 3:
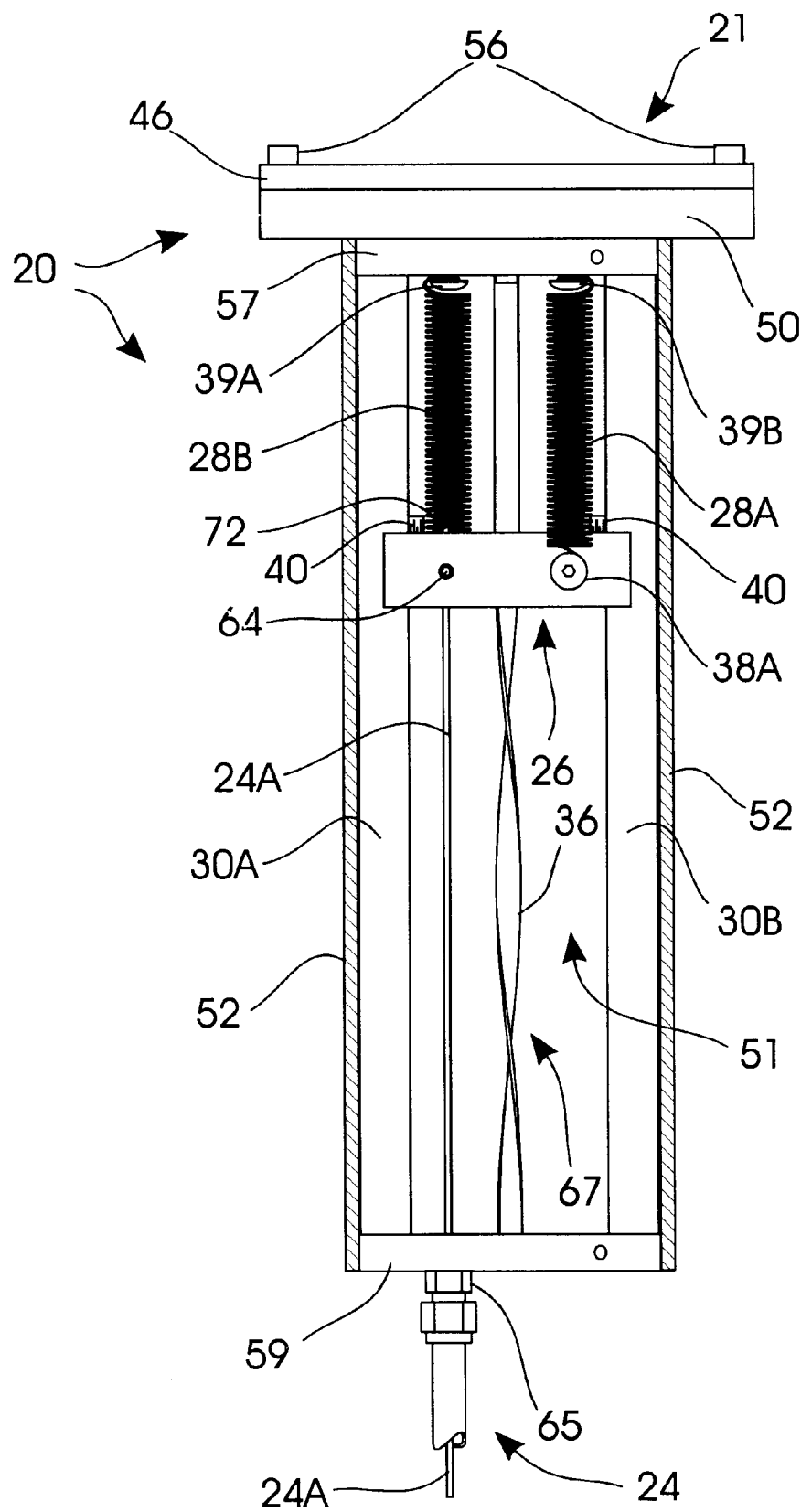
FIG. 3 is a side elevational view, with the opposite side being a mirror image thereof.

Referring now to the drawings, my portable gauge 20 measures the angular displacement of a moveable machine component. The gauge comprises an indicator 21 for displaying the observed angular displacement. Indicator 21 is preferably mounted at the front end of a tubular housing 52. Disposed within housing 52 is means for activating the indicator 21 in response to the angular displacement of the movable element being monitored. As seen in FIG. 6, a mounting clamp 78 at one end of a support arm 25 is manually fastened to a portion 27 (FIG. 6) of the machine being monitored. The moveable machine element is coupled to the activating means 68 via an elongated cable assembly 24 that extends between clamp 78 and the housing 52.

Indicator 21 comprises a dial plate 50 covered by a transparent viewing plate 42. Plate 42 is secured to dial plate 50 by frame 46 that is attached by appropriate fasteners 56. Indicator 21 is securely attached to the front end of housing 52 by a pair of flush mounting screws 54. Screws 54 are threadably received within suitable orifices in front cap 57. Housing 52 is circular in cross section, comprising an open end 51 in which cap 57 is received. Screws 53 secure cap 57, that forms the front end of the tubular housing 52.

Indicator dial plate 50 receives a pointer 67 for indicating angular displacement. Orifice 70 disposed at the center of plate 50 is concentric with a circular recess 71. Pointer orifice 70 aligns with a similar orifice 62 in front cap 57 to mount pointer 67 by passing pointer shaft 36 into interior 71. Orifices 62, 70 are penetrated by pointer shaft 36, with needle 67A mounted for concentric rotation within recess 71 dependent upon cable deflection.

Figure 4:
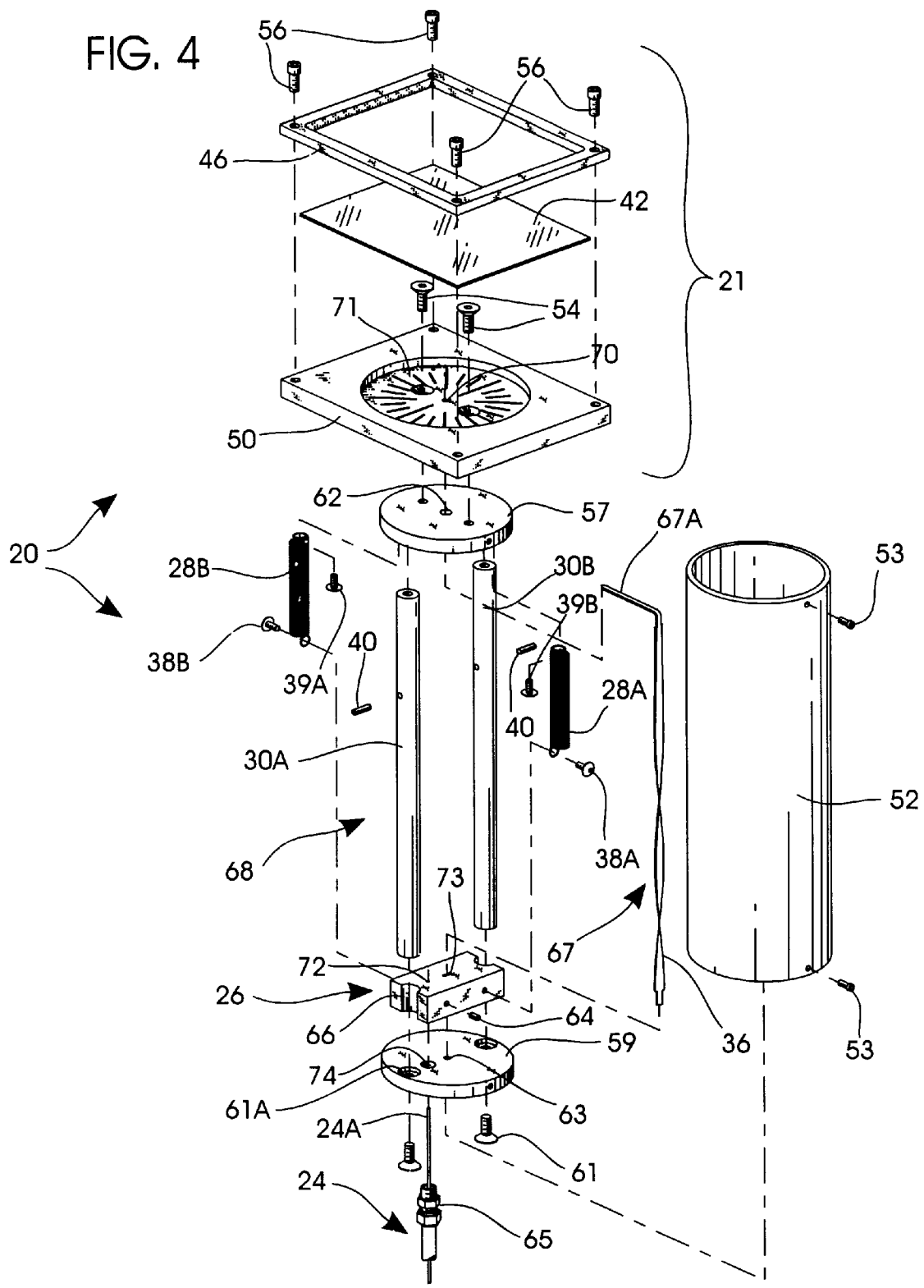
FIG. 4 is an exploded isometric view of the invention.

Pointer 67 and indicating needle 67A is are rotatably deflected by activating means 68 disposed within tubular housing 52 (FIG. 4). Activating means 68 preferably comprises a track formed by and between a pair of parallel, spaced apart rods 30A, 30B secured at the unit front end to front cap 57 by screws 54. The opposite ends of rods 30A, 30B are secured to rear cap 59 within orifices 61A by flush mount screws 61 (FIG. 4). Captivated between rods 30A, 30B is an actuator 26 that slides within the housing 52. Actuator 26 is preferably a parallelepiped solid comprising a rectangular cross section. The actuator comprises follower slots 66 in its opposite ends of semicircular cross section that flushly abut the rods 30A, 30B. Cable assembly 24 is mechanically coupled to the actuator through the housing plate 59 (FIGS. 1, 4). The actuator is torsionally restrained by the rods, but they allow it to slide within the housing. The internal wire portion 24A of the cable assembly is deflected b machine part movement to rotate the pointer needle 67A.

Springs 28A, 28B are attached at their lower ends to actuator 26 and at their upper ends to plate 50 by standard fasteners 38A, 38B, 39A, 39B (FIG. 4). Springs 26A, 26B yieldably bias actuator 26 to a rest position set by stop screws 40 (FIG. 1) thereby registering zero angular displacement of a moveable part. The internal wire 24A of cable assembly 24 is securely attached to actuator 26 at mount point 72 such that movement of the wire 24A is translated into linear displacement of actuator 26. The threaded pointer shaft 36 is in the form of a twisted helix. It is slidably mated to actuator 26 within a slot 73 (FIG. 1). When actuator 26 moves linearly within the enclosure, it forces the pointer shaft to rotate. The pointer shaft 36 is rotatably terminated by rear cap orifice 63. Cap 59 (FIG. 4) is secured to tubular housing 52 by set screw 53 thus forming the rear wall of gauge 20 (FIG. 1). Cable orifice 74 in cap 59 is adapted to receive upper cable mounting hardware 65 (FIG. 4). Similar mounting hardware 81 is disposed at the lower end of sheath 75 for connecting to clamp 78.

Operation

Figure 5:
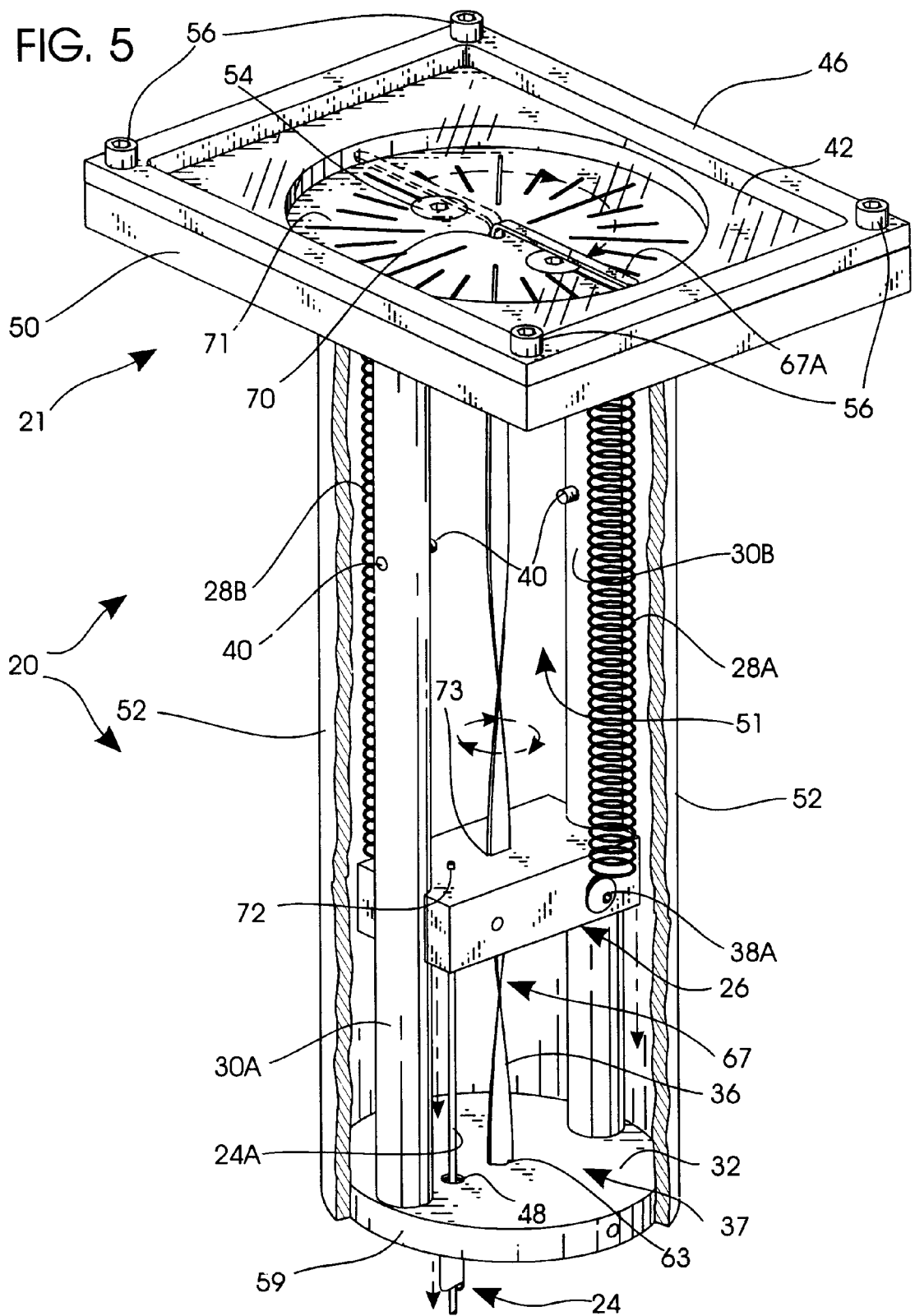
FIG. 5 is a partially fragmentary, isometric view similar to FIG. 1, but showing parts in a moved position; and, FIG. 6 is a side elevational view of the invention.

Operation of my quick mount angle measurement gauge 20 is illustrated in (FIG. 5). Gauge 20 is attached to a moveable machine part 27 (FIG. 6) with clamp 78 and secured by tightening clamp screw 77. Gauge 20 is positioned by moving adjustable arm 76 and locking the upper and lower pivot mount screws 79, 80 (FIG. 7). As an operator displaces a moveable machine part, wire 24A is displaced within sheath 75, sliding actuator 26 along rods 30A, 30B. Follower slots 66 prevent actuator 26 from rotating, thereby resulting in even movement along rods 30A, 30B. Screw thread 36 rotates as actuator 26 moves along rods 30A, 30B. Pointer 67 rotates within interior 71 in direct response to rotation of thread 36. Pointer 67 displacement is directly proportional to the angular displacement of a moveable machine part.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable gauge for measuring the angular displacement of a movable part on a machine, said gauge comprising:

a rigid housing comprising an interior;

indicator means secured to said housing for displaying angular displacement of said movable part, said indicator means comprising pointer means external of said housing for rotating in response to angular displacement of said part;

cable means for interconnecting said indicator means to said movable machine part to activate said indicator means in response to movement of said movable part whereby said pointer means is displaced;

wherein said indicator means comprises actuator means that is longitudinally displaceable within said housing in response to movement of said machine part for rotating said pointer means; and, means for slidably mounting said actuator means interiorly of said housing means.

2. The gauge as defined in claim 1 further comprising spring means for yieldably biasing said actuator means to a rest position whereby said pointer means indicates zero angular displacement of said movable part.

3. The gauge as defined in claim 2 wherein said housing is rigid and tubular, and the gauge further comprises a front cap fastened to said housing, and a spaced apart rear cap fastened to said housing.

4. The gauge as defined in claim 3 wherein said means for slidably mounting said actuator means comprises a pair of spaced apart, parallel rods extending within said housing from said front cap to said rear cap.

5. The gauge as defined in claim 4 wherein said actuator means is slidably mounted between said rods.

6. The gauge as defined in claim 5 wherein said actuator means comprises follower means slidably engaging said rods for preventing said actuator from twisting or rocking in response to said cable means.

7. The gauge as defined in claim 6 wherein said pointer means comprises an elongated shaft penetrating said actuator means.

8. A portable gauge for measuring the angular displacement of a movable part on a machine, said gauge comprising:

clamp means for mounting said gauge to said machine;

a rigid, tubular housing having an interior;

indicator means for displaying angular displacement of said movable part, said indicator means comprising a viewable dial secured to said housing and rotatable pointer means external to said housing comprising an indicator needle positioned over said dial;

arm means extending from said clamp means to said housing for adjustably positioning said gauge;

cable means for interconnecting said indicator means to said movable machine part;

wherein said indicator means comprises actuator means that is longitudinally displaceable within said housing in response to said cable means for rotating said pointer means to provide a measurement;

rod means within said housing for slidably mounting said actuator means and for preventing torsional displacements thereof; and, spring means within said housing for yieldably biasing said actuator means to a rest position wherein said gauge indicates zero angular displacement of said movable part.

9. The gauge as defined in claim 8 wherein said pointer means comprises a threaded shaft extending from said dial through said actuator means for rotating the pointer means in response to linear displacement of said actuator means.

10. The gauge as defined in claim 9 wherein said housing comprises a front terminating in a front cap adjacent said dial and a rear terminating in a rear cap.

11. The gauge as defined in claim 10 wherein said rod means comprises a pair of spaced apart rods extending within said housing interior from said front cap to said rear cap.

12. The gauge as defined in claim 11 wherein said actuator means is slidably mounted between said rods.

13. The gauge as defined in claim 12 wherein said actuator means comprises follower means slidably engaging said rods for preventing twisting or rocking.

14. A portable gauge for measuring the angular displacement of a movable part on a machine, said gauge comprising:

a rigid housing having an interior;

clamp means for mounting said gauge to said machine;

indicator means for displaying angular displacement of said movable part, said indicator means comprising a viewable dial secured to said housing and a rotatable pointer external to said housing adjacent said dial;

arm means extending from said clamp means to said housing for adjustably positioning said dial for convenient viewing;

cable means secured by said clamp means for interconnecting said is indicator means to said movable machine part;

wherein said indicator means comprises an actuator that is longitudinally displaceable within said housing in response to said cable means;

track means within said housing for slidably mounting said actuator;

threaded means extending from said pointer through said actuator for rotating the pointer in response to linear displacement of said actuator; and, within said housing spring means for yieldably biasing said actuator to a rest position wherein said pointer indicates zero angular displacement of said movable part.

15. The gauge as defined in claim 14 wherein said housing comprises a front terminating in a front cap adjacent said dial and a rear terminating in a rear cap.

16. The gauge as defined in claim 15 wherein said track means comprises a pair of spaced apart, parallel rods extending within said housing interior from said front cap to said rear cap, and said actuator means is slidably mounted between said rods.

* * * * *